United States Patent
Borum et al.

(10) Patent No.: US 6,895,067 B2
(45) Date of Patent: May 17, 2005

(54) SMOOTH COLLET FOR PULLING FUEL RODS

(75) Inventors: George Borum, Farmville, VA (US); Michael Ryan, Forest, VA (US)

(73) Assignee: Framatome Anp, Inc., Lynchburg, VA (US)

(*) Notice: Subject to any disclaimer, the term of this patent is extended or adjusted under 35 U.S.C. 154(b) by 139 days.

(21) Appl. No.: 10/135,613

(22) Filed: Apr. 30, 2002

(65) Prior Publication Data

US 2003/0202626 A1 Oct. 30, 2003

(51) Int. Cl.[7] .............................................. G21C 19/00
(52) U.S. Cl. ...................... 376/261; 376/260; 376/267; 376/268; 376/269; 376/270; 376/271; 376/203; 376/204
(58) Field of Search ................................ 376/261, 260, 376/267–271, 203, 204

(56) References Cited

U.S. PATENT DOCUMENTS

| | | | | |
|---|---|---|---|---|
| 2,297,548 A | * | 9/1942 | Fox et al. ................... 285/169 |
| 2,548,528 A | * | 4/1951 | Hansen ........................ 284/19 |
| 4,134,789 A | * | 1/1979 | Aubert .......................... 176/30 |
| 4,297,776 A | * | 11/1981 | Fogg ............................ 29/252 |
| 4,637,914 A | * | 1/1987 | Boyle et al. ................. 376/353 |
| H209 H | * | 2/1987 | Oakley ........................ 376/261 |
| 4,639,998 A | * | 2/1987 | Shallenberger et al. .... 29/426.5 |
| 4,747,997 A | * | 5/1988 | Boatwright .................. 376/261 |
| 4,966,745 A | * | 10/1990 | Widener et al. ............. 376/264 |
| 5,043,134 A | * | 8/1991 | Widener et al. ............. 376/264 |
| 5,251,243 A | * | 10/1993 | Nylund et al. ............... 376/261 |
| 5,317,609 A | * | 5/1994 | Fichet et al. ................. 376/261 |
| 5,559,843 A | * | 9/1996 | Amiet et al. ................. 376/261 |

* cited by examiner

*Primary Examiner*—Jack Keith
(74) *Attorney, Agent, or Firm*—Vytas R. Matas

(57) ABSTRACT

A method and apparatus is disclosed for smoothly inserting a fuel rod loader through the skeleton of a fuel cell and then for pulling an attached fuel rod into the fuel rod skeleton while keeping the fuel rod under constant tension and preventing the bowing of the fuel rod. The pulling mechanism comprises a smooth collet with a smooth bullet end cap for guiding the puller mechanism into and through the skeleton where the bullet end cap is removed and the fuel rod is attached with a unique ball and slide mechanism actuated by a long puller rod that grabs the end of the fuel rod by a forward motion of the puller rod and is easily removed from the fuel rod by reversing this motion once the fuel rod is in place.

3 Claims, 3 Drawing Sheets

SECTION B-B

SMOOTH COLLET FOR PULLING FUEL RODS

BACKGROUND OF THE INVENTION

1. Field of the Invention

The present invention generally relates to nuclear fuel rod loaders for pulling fuel rods into a fuel rod skeleton and more particularly nuclear fuel rod loaders which avoid fuel rod bowing and maintain the fuel rod in tension.

2. Description of the Prior Art

In a nuclear reactor, the core includes a series of fuel assemblies each having top and bottom nozzles with a plurality of elongated transversely spaced guide thimbles extending longitudinally between the nozzles and a series of transverse support grids axially spaced along and attached to the guide thimbles. Each fuel assembly also has a plurality of elongated fuel rods transversely spaced apart from one another and from the guide thimbles and supported by the transverse grids between the top and bottom nozzles. The fuel rods contain fission material and are grouped together in an array organized to provide a neutron flux in the core sufficient to support a high rate of nuclear fission. The reactor also has control rods, which are inserted into the guide thimbles to control the fission reaction. The fission reaction releases energy in the form of heat. A liquid coolant is pumped up through the core in order to extract the heat generated in the core for the production of steam, which runs electric generators.

In the construction of a fuel assembly, the guide thimbles are affixed to the grids to form a fuel assembly skeleton. The fuel rods are then loaded into the skeleton, passing through the cells of the grids. Typically, a fuel rod loader is used which pulls the fuel rods into the grids. The loader has a rod gripper, which is inserted through the skeleton and is coupled to the end plug of a fuel rod. It is then withdrawn, pulling the attached fuel rod into the skeleton. The top and bottom nozzles are then affixed to the skeleton to complete the fabrication of the fuel assembly.

Some known nuclear fuel rod loaders are described in issued U.S. Patents:

U.S. Pat. No. 4,297,776 teaches a loader which inserts fuel rods into a fuel rod grid by pulling the fuel rods into the grid using a leaf spring type collet that grabs the end of the fuel rod with the leaf springs when a puller rod is moved forward and releases the fuel rod by reversing this motion.

U.S. Pat. No. 4,747,997 teaches a loader which inserts fuel rods into a fuel rod grid by pulling the fuel rods into the grid using a rod gripper which is slit at the end to provide expandable fingers and which is extended to fit into the hollow end portion of the fuel rod. The end fingers are then expanded to grab the fuel rod by having an inner shaft move forward in the gripper mechanism to spread the fingers of the gripper end. The fuel rod is released by reversing the motion of the inner member to release the expanded fingers.

U.S. Pat. No. 5,317,609 teaches a method of inserting an array of fuel rods into a fuel rod skeleton by pulling the fuel rod assembly into the skeleton using a grabber mechanism that grabs the end of the fuel rods and pulls them therein.

Loaders of this design have fuel rod grippers, which have a tendency to have their closed slot end snag on a grid dimple during insertion of the puller into the fuel assembly skeleton. Bent and broken-away dimples have occurred. Thus a loader having a smooth collet design was needed for inserting the collet through the fuel rod skeleton as well as for pulling the fuel rods smoothly into the fuel assembly skeleton without damaging the skeleton.

SUMMARY OF THE INVENTION

The present invention solves the mentioned problems associated with prior art fuel rod loaders and others by providing an improved method and apparatus for smoothly inserting the loader through the skeleton and then for pulling an attached fuel rod into the fuel rod skeleton while keeping the fuel rod under constant tension and preventing the bowing of the fuel rod.

To accomplish this end of having the fuel rods smoothly pulled into the grid, the pulling mechanism comprises a smooth collet with a smooth bullet end cap for guiding the puller mechanism into the skeleton and then for removing the bullet end cap and grabbing the end of the fuel rod with a unique ball and slide mechanism. The collet is attached to a long puller rod that grabs the end of the fuel rod by a forward motion of the puller rod and is easily removed from the fuel rod by reversing this motion once the fuel rod is in place and the puller needs to be retrieved.

In view of the foregoing it will be seen that one aspect of the present invention is to provide a smooth collet design fuel rod loader which will ride smoothly into a fuel cell skeleton grid to load fuel rods therein.

Another aspect is to provide a fuel rod loading collet, which will keep the fuel rod under constant tension during loading.

Yet another aspect is to provide a smooth collet loader having all fuel rod locking devices encapsulated in a smooth outer sleeve.

These and other aspects will be more fully understood after a perusal of the description of the preferred embodiment when considered in conjunction with the following drawings.

DESCRIPTION OF THE PREFERRED EMBODIMENT

Figure 1:
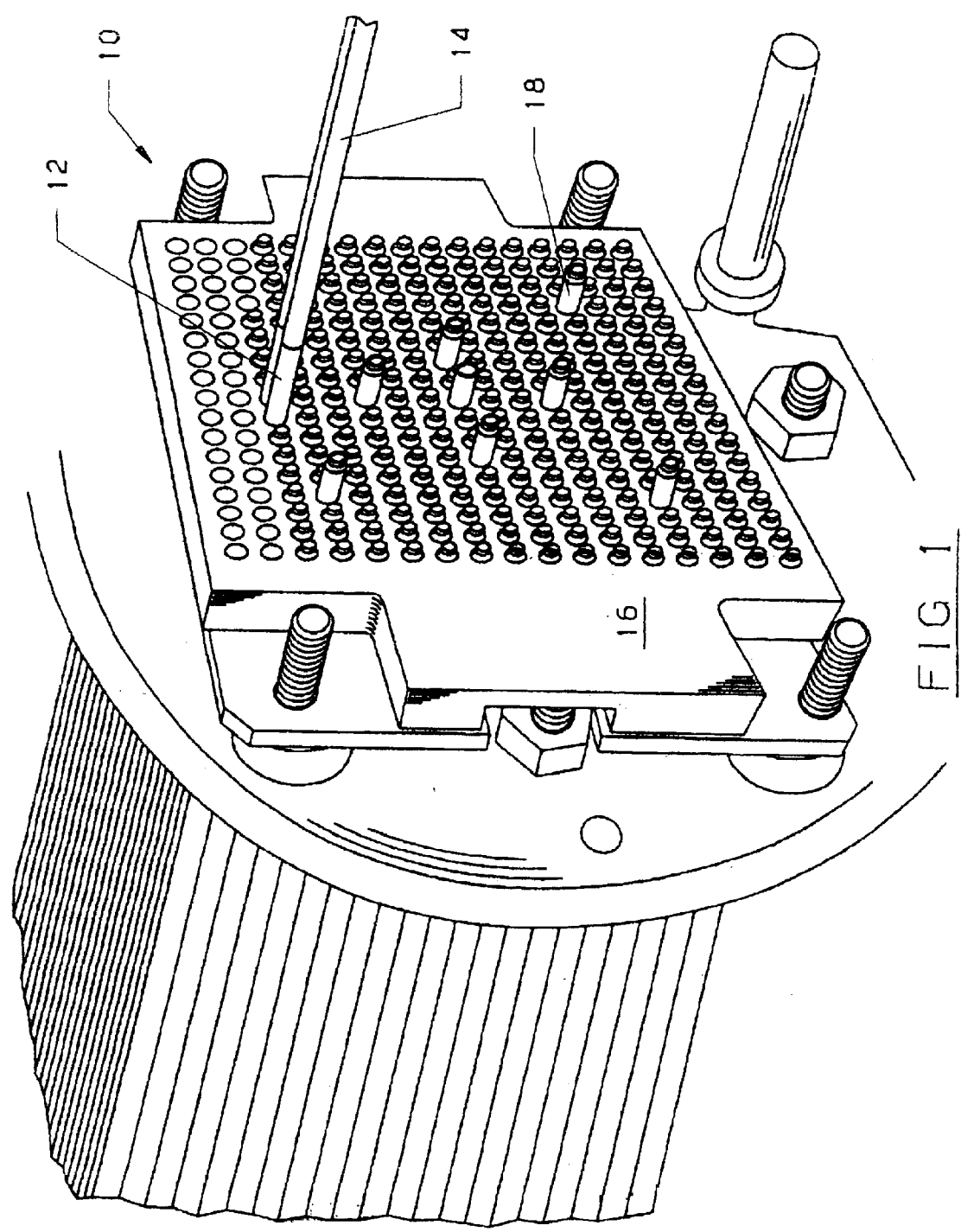
FIG. 1 is a perspective view of a fuel rod assembly showing the collet loader of the present invention extended through a fuel rod holding area and connected to a fuel rod for pulling into the fuel rod skeleton assembly.

Referring now to the drawings generally and FIG. 1 in particular, a nuclear fuel assembly (10) is shown with a collet assembly (12) of the present invention connected to a fuel rod (14) and positioned to be drawn into a fuel rod opening of the fuel assembly (10). The fuel assembly (10) is the type used in a pressurized water reactor (PWR) and basically includes a bottom nozzle (16) for supporting the assembly on the lower core plate (not shown) in the core region of a nuclear reactor (not shown), and a number of longitudinally extending guide thimbles (18) which project upwardly from the bottom nozzle (16). The fuel assembly (10) further includes a plurality of transverse grids axially spaced along the guide thimbles and an organized array of elongated fuel rods transversely spaced and supported by the grids. Also the assembly has a top nozzle (not shown) attached to the upper ends of the guide thimbles. The lower ends of the guide thimbles are attached to the adaptor plate of the bottom nozzle. With such an arrangement of parts, the fuel assembly (10) forms an integral unit capable of being conventionally handled without damaging the assembly parts.

As mentioned above, the fuel rods in the fuel assembly (10) are held in spaced relationship with one another by the grids spaced along the fuel assembly length. Typically each fuel rod (14) contains nuclear fuel pellets of uranium dioxide. A liquid moderator/coolant, such as water or water containing boron, is pumped upwardly through the thimbles (14) and along the fuel rods of the fully assembly (10) in order to extract heat generated therein for the production of useful work. To control the fission process, a number of control rods (not shown) are reciprocally movable in the guide thimbles (18) located at predetermined positions in the fuel assembly (10).

In the fabrication of a nuclear fuel assembly (10), the fuel rods are loaded into a fuel assembly skeleton. The fuel assembly skeleton consists of the guide thimbles attached to the grids. Each grid cell has springs and dimples which laterally support the fuel rod to be loaded therein.

Figure 2:
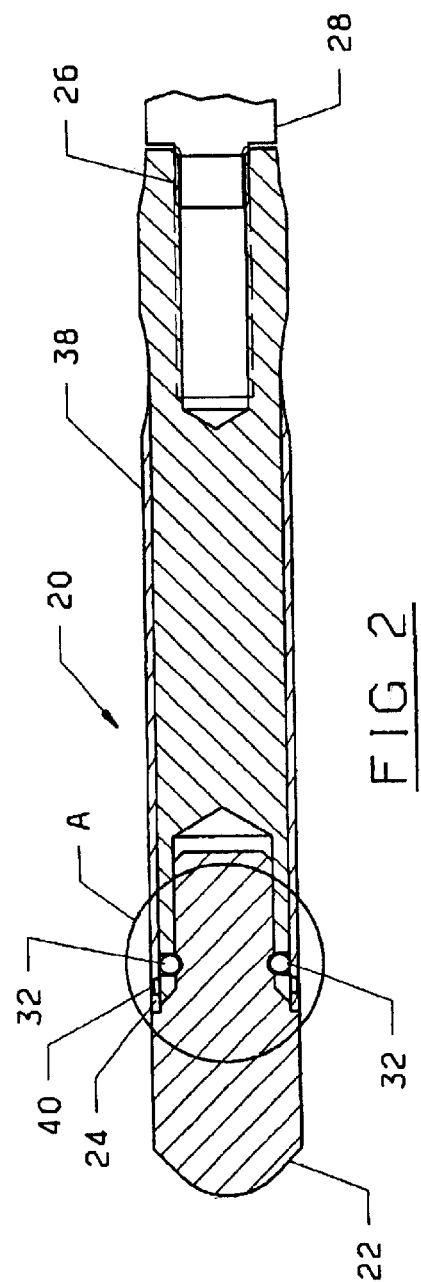
FIG. 2 is a cut away view of the collet of the present invention having a bullet cap over the rod-connecting end, shown in the un-locked position, thereof.
Figure 4:
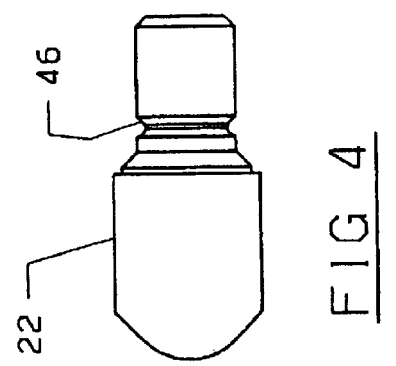
FIG. 4 is a perspective view of the bullet cap shown in FIG. 2.
Figure 3:
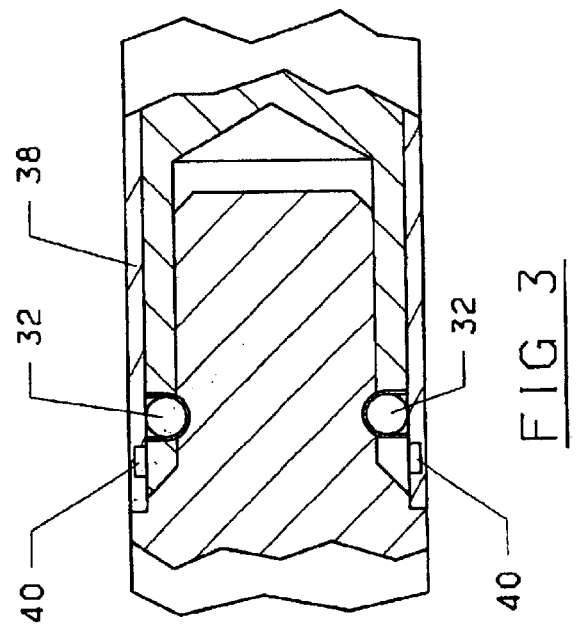
FIG. 3 is an expanded view of the circled area A of FIG. 2.
Figure 5:
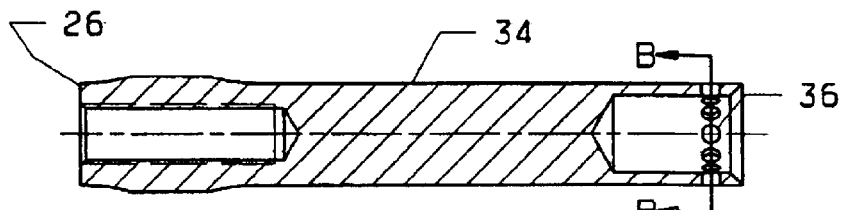
FIG. 5 is a sectional view of the inner sleeve of the FIG. 2 collet.
Figure 6:
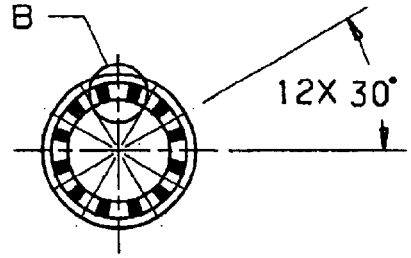
FIG. 6 is a cross sectional view of the inner sleeve of FIG. 5 taken along section B—B.
Figure 7:
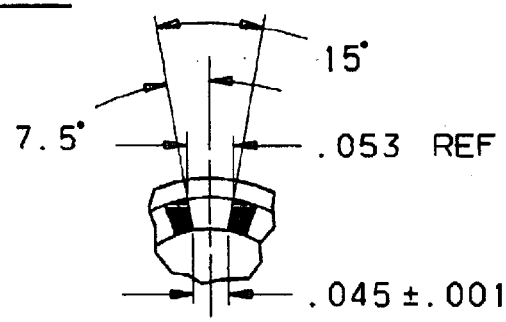
FIG. 7 is an expanded view of an area B of FIG. 6.

With particular reference to FIGS. 2–4 the fuel rod loading collet assembly (20) of the invention is shown ready for insertion into the fuel assembly (10) skeleton prior to connection to a fuel rod. For extending the collet assembly through a fuel rod cell of the reactor (10) a bullet shaped end cap (22) is mounted to the fuel rod holding end of (24) the collet assembly (10). This is done to provide a smooth surfaced fuel rod puller, which will not catch on any of the fuel cell internal surfaces. The other end (26) of the collet assembly (20) is connected to a long rod (28) sufficiently long to extend the collet (20) and bullet (22) through the fuel assembly (10) skeleton. This connection is formed by threading the rod (28) into the end (26) of the collet (20).

Figure 8:
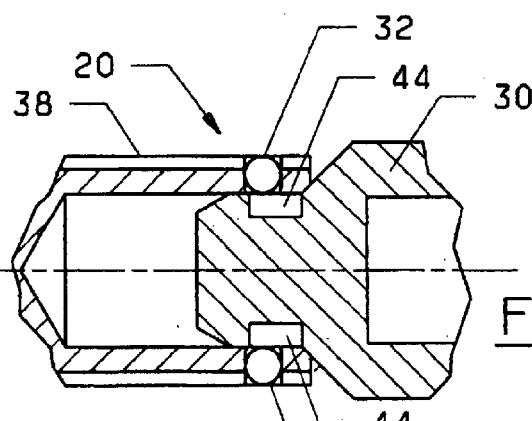
FIG. 8 is an expanded view of area C, the un-locked position, of the FIG. 9 collet.
Figure 9:
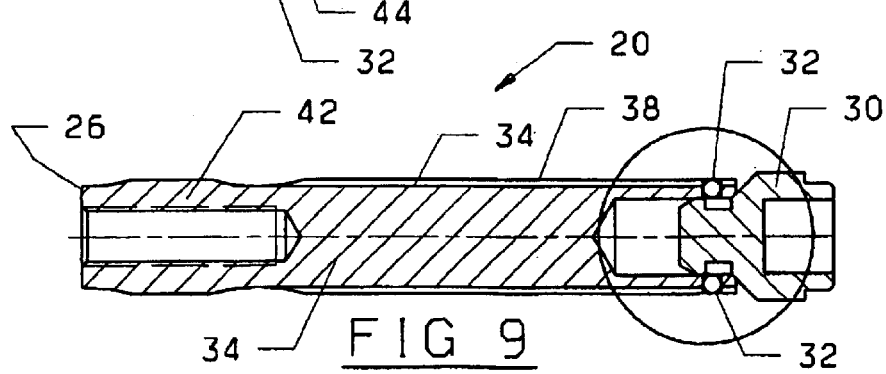
FIG. 9 is a sectional view of the collet of the present invention shown connected to one end of a fuel rod in the un-locked position.

Once the collet (20) and bullet (22) are extended through the fuel assembly (10), the bullet (24) is removed and the collet, in the un-locked position, is connected to a lower end cap of the fuel rod (14) as shown in FIGS. 8 and 9. The outer sleeve (38) is moved forward locking the balls (32) into the groove (44) of the fuel rod (14). The fuel rod (14) is now pulled into the fuel assembly (10).

The purpose of the collet (20) is to pull the fuel rods into an unkeyed skeleton without causing any damage to the fuel rod or the skeleton either during the collet (20) insertion or fuel rod (14) pulling steps. A pulling system was chosen to prevent fuel rod bow and to keep the fuel rod in tension throughout all operations. The collet design offers the following benefits:

creates a means of grabbing the fuel rod lower end cap, which does not present any spacer grid hang-up concerns
attaches as to a longer puller rod
provides adequate pull strength forward motion
no hang-ups on the lower end cap when disengaging the collet
a bullet can be easily installed and locked into place.

The collet (20) locks and unlocks to either the bullet (22) or the fuel rod (14) in the same manner.

The collet (20) has a "ball lock" design. The design retains carbide balls on the inside diameter of an inner sleeve (34) by utilizing a series of tapered holes (36), the bottom of which are of a smaller diameter than the balls (32). The outer sleeve (38) retains the balls (32) from falling out of the collet (20) assembly and is used to engage and disengage the collet from the end cap (30) of the fuel rod and bullet (22). The outer sleeve (38) has an undercut (40) on it to allow the balls (32) to push upward in order to disengage the collet (20) and the inside diameter forces the balls (32) downward when the collet (20) is engaged creating interference between the balls and the end cap (30). The outer sleeve is pinned at the ends to ensure the balls (32) do not escape the collet (20). This design has the following advantages.

1. The load for pulling the fuel rod is distributed evenly over the diameter of the collet.
2. Since a series of balls are used to pull the rods there are no open joints or raised material, which could cause grid damage.
3. The smooth collet bullet utilizes a quick connect/disconnect action for locking the bullet into place in order to thread it through grid cells. This design creates a smooth transition from the bullet itself to the collet when in place.
4. The smooth collet may also be used to push fuel rods should the need occur.
5. All of the locking component is encapsulated by the outer sleeve in both the engaged and disengaged positions to prevent a parts from becoming dislodged.

The inner sleeve (34) has an enlarged section (42), which is larger in diameter than the outer sleeve (38). The length of the outer sleeve (38) is such that when it abuts the enlarged section (42) which prevents any further retraction, the balls (32) fall within the recesses (40) as seen in FIGS. 2, 8, and 9. When the outer sleeve (38) is pulled away from the enlarged section (42) it pushes the balls (32) into a groove (44) of the fuel rod end cap (30) or a groove (46) formed in the bullet (22) to capture either on in the same way depending on which is inserted into the collet (22) as seen in FIG. 2. Moving the outer sleeve back towards the enlarged portion aligns the balls (32) with the apertures (40) and pulling out the bullet (22) of the end cap (30) forces them into the apertures (40) releasing the retained element. To prevent the outer sleeve (38) from completely sliding off the inner sleeve, a small dimple is formed at the appropriate maximum release on the inner sleeve (34), which aligns with a depression on the outer sleeve. A groove and pin arrangement could also be used.

Certain details and modifications are either well known or will be obvious to those of ordinary skill in this art area. These have been deleted herein for the sake of conciseness and readability but are intended to fall within the scope of the following claims.

We claim:

1. A method of loading fuel rods into a reactor skeleton having individual cells for fuel rods comprising the steps of:
   providing a smooth fuel rod puller mechanism having a removable bullet shaped end cap held in said fuel rod puller mechanism by a ball coupling mechanism for smooth insertion of the mechanism through a fuel rod cell;

pushing the mechanism bullet head first through a fuel rod skeleton cell;

removing the bullet shaped end cap from the ball coupling mechanism of said fuel rod puller mechanism to expose a fuel rod attachment mechanism;

connecting a fuel rod to the fuel rod to said ball coupling mechanism of said attachment mechanism; and pulling the fuel rod into the fuel rod cell.

2. A method of loading fuel rods into a reactor skeleton as set forth in claim 1 wherein said ball coupling mechanism of the puller mechanism includes a collet having an inner sleeve with a series of balls located along a circumference at one end of the inner sleeve and an outer sleeve slidably fitting over the inner sleeve and having a series of cut outs for retaining the balls in one position of the outer sleeve to provide a smooth inner surface on the inner sleeve and forcing the balls into the inner surface of the inner sleeve in a second position of the outer sleeve and wherein the bullet has a grooved surface fitting into the inner surface of the inner sleeve and being retained therein by the second position of the outer sleeve and wherein the step of removing the bullet shaped end cap comprises the steps of sliding the outer sleeve to the first position and pulling the bullet shaped end cap out of the inner surface of the inner sleeve.

3. A method of loading fuel rods into a reactor skeleton as set forth in claim 2 wherein the fuel rod has a grooved end cap fitting into the inner surface of the inner sleeve and the step of connecting the fuel rod comprises inserting the end cap into the inner surface of the inner sleeve and sliding the outer sleeve to the second position to lock the balls into the groove of the end cap and pulling the fuel rod into the fuel rod cell.

* * * * *